(12) United States Patent
Burke et al.

(10) Patent No.: US 6,535,721 B1
(45) Date of Patent: Mar. 18, 2003

(54) ARCHITECTURE FOR DEPENDABILITY ENHANCEMENT OF WIRELESS BASE STATIONS

(75) Inventors: Joseph P. Burke, Carlsbad, CA (US); Peter D. Heidmann, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/163,872

(22) Filed: Sep. 30, 1998

(51) Int. Cl.[7] .............................................. H04B 17/02
(52) U.S. Cl. ........................ 455/137; 455/273; 455/561
(58) Field of Search ................................. 455/132, 137, 455/272, 273, 277.1, 277.2, 561, 562, 134, 440; 375/347

(56) References Cited

U.S. PATENT DOCUMENTS

| | | | | |
|---|---|---|---|---|
| 4,704,734 A | * | 11/1987 | Menich et al. ............... | 455/562 |
| 5,127,025 A | * | 6/1992 | Okanoue ..................... | 455/562 |
| 5,243,598 A | * | 9/1993 | Lee ............................. | 455/562 |
| 5,325,403 A | * | 6/1994 | Siwiak et al. ............... | 455/134 |
| 5,432,780 A | * | 7/1995 | Smith et al. ................. | 455/562 |
| 5,530,725 A | * | 6/1996 | Koch ........................... | 455/137 |
| 5,553,102 A | * | 9/1996 | Jasper et al. ................ | 455/137 |
| 5,608,722 A | | 3/1997 | Miller ......................... | 370/320 |
| 5,684,491 A | * | 11/1997 | Newman et al. ......... | 455/277.1 |
| 5,828,944 A | * | 10/1998 | Uppaluri et al. ............ | 455/562 |
| 5,839,071 A | * | 11/1998 | Johnson ...................... | 455/440 |
| 5,933,787 A | * | 8/1999 | Gilhousen et al. ....... | 455/277.1 |

FOREIGN PATENT DOCUMENTS

WO          9813952       4/1998

* cited by examiner

Primary Examiner—Quochien Vuong
(74) Attorney, Agent, or Firm—Russell B. Miller; Christopher O Edwards

(57) ABSTRACT

A base station and receiver system for use in a base station which achieves enhanced dependability by logically separating the diversity reception paths into different failure paths. In one embodiment, the receiver system includes a first diversity reception path for receiving a first radio signal and a second diversity reception path for receiving a second radio signal. The first and second radio signals may be amplitude and phase shifted versions of the same information signal according to well known principles of diversity reception. At least one demodulator diversity combines the first and second radio signals and demodulates the diversity combined first and second radio signals. Additionally, the first and second diversity paths are logically separated into different failure paths.

9 Claims, 3 Drawing Sheets

ARCHITECTURE FOR DEPENDABILITY ENHANCEMENT OF WIRELESS BASE STATIONS

BACKGROUND OF THE INVENTION

I. Field of the Invention

The present invention relates to wireless receivers and receive paths in a base station. More specifically, the present invention relates to an improved receiver system architecture for wireless base stations which achieves enhanced dependability by separating diversity reception paths.

II. Description of the Related Art

In the field of wireless telecommunications, such as various cellular, Personal Communication Services (PCS), and Wireless Local Loop (WLL) communication systems, many different communication standards exist. For example, Code-Division Multiple Access (CDMA) digital communications may be governed by either Telecommunications Industry Association (TIA)/Electronics Industries Association (EIA) Interim Standard IS-95 (series) for cellular systems, or by ANSI J-STD-008 for PCS systems. Additionally, Time-Division Multiple Access (TDMA) digital communications may be governed by the TIA/EIA IS-54, or by the European standard Global System for Mobile Communications (GSM). Furthermore, analog FM-based communications systems may be governed by the Advanced Mobile Phone System (AMPS) standard or a related standard such as N-AMPS. Other wireless communication standards also exist for both digital and analog modulation.

According to any one of the above standards, wireless base stations communicate signals to one or more wireless mobile stations, such as cellular phones, PCS phones, or WLL phones. The wireless base stations primarily serve as the wireless "gateway" to the telephone system. In general, the wireless base station will be in communication with many mobile stations at one time.

The ability of the base station to operate when an internal software, hardware or other failure occurs is inherent to the base station architecture. The ability of the base station to continue to operate, either through "switching-in" additional backup or properly working components or by operating in a "reduced capacity" mode, is a measure of how well the base station architecture was designed.

For wireless communication systems, the system designer strives to design a base station architecture which is both cost-effective and highly reliable. One aspect of this is when a failure occurs at the base station, it does not result in loss of communications with the many mobile stations it may be serving. As a result, the system designer strives to connect the various base station components: front ends, receivers, demodulators, etc., in a manner which provides the best system reliability while still maintaining good performance, low cost, small size, low complexity, high degree of modularity, etc.

Wireless service providers who purchase and operate the base stations often specify a Mean Time Between Failure (MTBF) which represents the average amount of "downtime" that is tolerable. Often, this MTBF will be expressed as a total allowable downtime per year. "Downtime" is frequently defined as when the base station is unable to communicate at all with any mobile stations. Most service providers are keenly aware of this downtime because it results in a complete loss of revenues from that base station for the duration of the outage. As a result, a service provider will generally prefer that if a base station subsystem or component fails, that failure should affect the operation of the base station in the least significant way. Thus, reduced capacity modes of operation or partial degradations in service are strongly preferred over total loss of service.

A common base station architecture 100 which does not have optimum redundancy is shown in FIG. 1. In FIG. 1, a pair of antennas 102A, 102B capture RF signals and provide them to RF front end 104. Antennas 102A, 102B may be used for diversity reception, a well-known receiving technique in which the signal of interest is better received and processed by virtue of having two antennas receiving signals which can be compared and/or combined.

RF front end 104 typically comprises various bandpass filters and low-noise amplifiers which perform some initial frequency selection and signal amplification. RF front end 104 outputs two amplified signals 106A, 106B which correspond to antennas 102A and 102B, respectively. Receiver 108 receives, downconverts, and performs intermediate-frequency (IF) processing on the amplified signals 106A, 106B, and generates received signals 110A and 110B which correspond to antennas 102A and 102B, respectively. Demodulators 112A–112N demodulate and perform IF and/or baseband processing on the signals 110A, 110B, thereby recovering the signal of interest from the RF signals received by antennas 102A, 102B. The architecture of FIG. 1 may be generalized to multiple receive paths, one for each sector being served by the base station.

In the architecture of FIG. 1, the RF front end 104 and the receiver 108 are single points of failure. That is to say that when either RF front end 104 or receiver 108 fails for any reason, it breaks the receive path from antennas 102A, 102B to demodulators 112A–112N. Thus, any failure of RF front end 104 or receiver 108 will result in total loss of service for the base station employing the architecture 100 of FIG. 1. A single failure path defined by RF front end 104 and receiver 108 exists whereby failure of any unit in the failure path will result in failure of the entire reception path. Namely, RF front end 104 and receiver 108 are both in the same diversity reception path and also in the same failure path.

A common improvement made to the base station architecture of FIG. 1 is to provide a separate, redundant receive path which can be switched-in when the primary receive path fails. This is implemented by providing duplicate components such as a duplicate receiver 109 coupled by bypass switches 107, 111 which connect RF front end 104 and demodulators 112A–112N to the duplicate receiver 109 when the primary receiver 108 fails. This is often referred to as providing "N+1 redundancy" where there are N primary operating components and 1 duplicate component in standby that can be switched in to take the place of any one of the N primary operating components when there is a failure. Note also that bypass switch 107 could be placed before the RF front end 104, and a redundant RF front end (not shown) could also be switched in.

In addition to the increased cost, size and complexity of providing duplicate components for the N+1 redundancy, the bypass switches 107, 111 introduced in the receive path can introduce further undesirable signal level losses, thereby degrading the receive path performance. For example, a typical signal level loss incurred when introducing a switch matrix into the receive path is approximately 0.2 dB to 0.5 dB. This can be very significant when the receive path noise figure is typically in the 3 dB to 6 dB range. In addition, the control circuitry hardware and software (not shown) needed to detect a failure and control the switches also adds complexity, cost, size, and power dissipation to the base station. One can also call into question the reliability of the switches themselves.

What is needed is a base station architecture which improves the overall base station reliability without adding significant complexity or cost.

SUMMARY OF THE INVENTION

The present invention is a novel and improved base station and receiver system for use in a base station which achieves enhanced dependability by logically separating the diversity reception paths into different failure paths. In one embodiment, the receiver system includes a first diversity reception path for receiving a first radio signal and a second diversity reception path for receiving a second radio signal. The first and second radio signals may be amplitude and phase shifted versions of the same information signal according to well-known principles of diversity reception. At least one demodulator compares and/or combines the first and second radio signals in a diversity reception manner. But the first and second diversity paths are logically separated into different failure paths. The receiver system may further comprise a distribution bus which provides the received first radio signal and the received second radio signal to the demodulator.

In this embodiment, the first and second diversity reception paths may each comprise first and second diversity antennas and first and second diversity receivers. The first diversity receiver is coupled to an output of the first diversity antenna and the second diversity receiver is coupled to an output of the second diversity antenna. Furthermore, a first RF front end circuit may be coupled to an output of the first diversity antenna, and a second RF front end circuit may be coupled to an output of the second diversity antenna. The first and second RF front end circuits filter and amplify signals received by the first and second diversity antennas.

In an exemplary embodiment, the first and second receivers generate in-phase and quadrature samples of signals received by the first and second diversity antennas. Other embodiments generate other received signal formats.

The receiver system described above is useful for application in a wireless base station. In particular, the receiver system described above, having a first diversity antenna and a second diversity antenna, may be used in a base station having a single or plurality of sectors with each sector supporting a single or plurality of frequency assignments. The base station may also have many first and second diversity receivers, with the first diversity receivers coupled to an output of each of the first diversity antennas and the second diversity receivers coupled to an output of each of the second diversity antennas, i.e. many diversity receivers sharing one or more common diversity specific antennas. Again, the first and second diversity receivers are logically separated into different failure paths. Additionally, each of the first and second diversity receivers may handle many frequency assignments.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Various embodiments of the present invention are applicable to all wireless base stations which utilize diversity reception techniques. For clarity and simplicity, the embodiments of the present invention will be disclosed with reference to an exemplary Code-Division Multiple Access (CDMA) wireless communication system. However, it is understood that the present invention is equally applicable to wireless communication systems using other modulation techniques whether digital or analog in nature. The present invention pertains to optimally designing the architecture of a base station that employs receive diversity antennas to allow enhanced redundancy on the receive path without additional hardware cost and without direct impact on the normal receive path operating performance.

The term "soft redundancy" implies that when a failure does occur in a base station architecture, the failure results in reduced capacity or reduced coverage and not the complete loss of communication with mobile stations in the affected sector. The present invention achieves soft redundancy on the receive path without adversely affecting the receiver path gain and noise figure and without adding the duplicate hardware, software, and control circuitry needed to effect N+1 redundancy.

The present invention physically separates the diversity receive paths for each base station sector on different physical components. By keeping the diversity receive paths physically separate, the present invention obtains soft redundancy without additional hardware, software, size or power dissipation. Physical separation of the diversity receive paths may include physically separate hardware, software, timing signals and other control signals into different failure paths. It further may include distributing some hardware components, software modules and control signals throughout the base station in a manner that still maintains a soft redundancy architecture.

Figure 2:
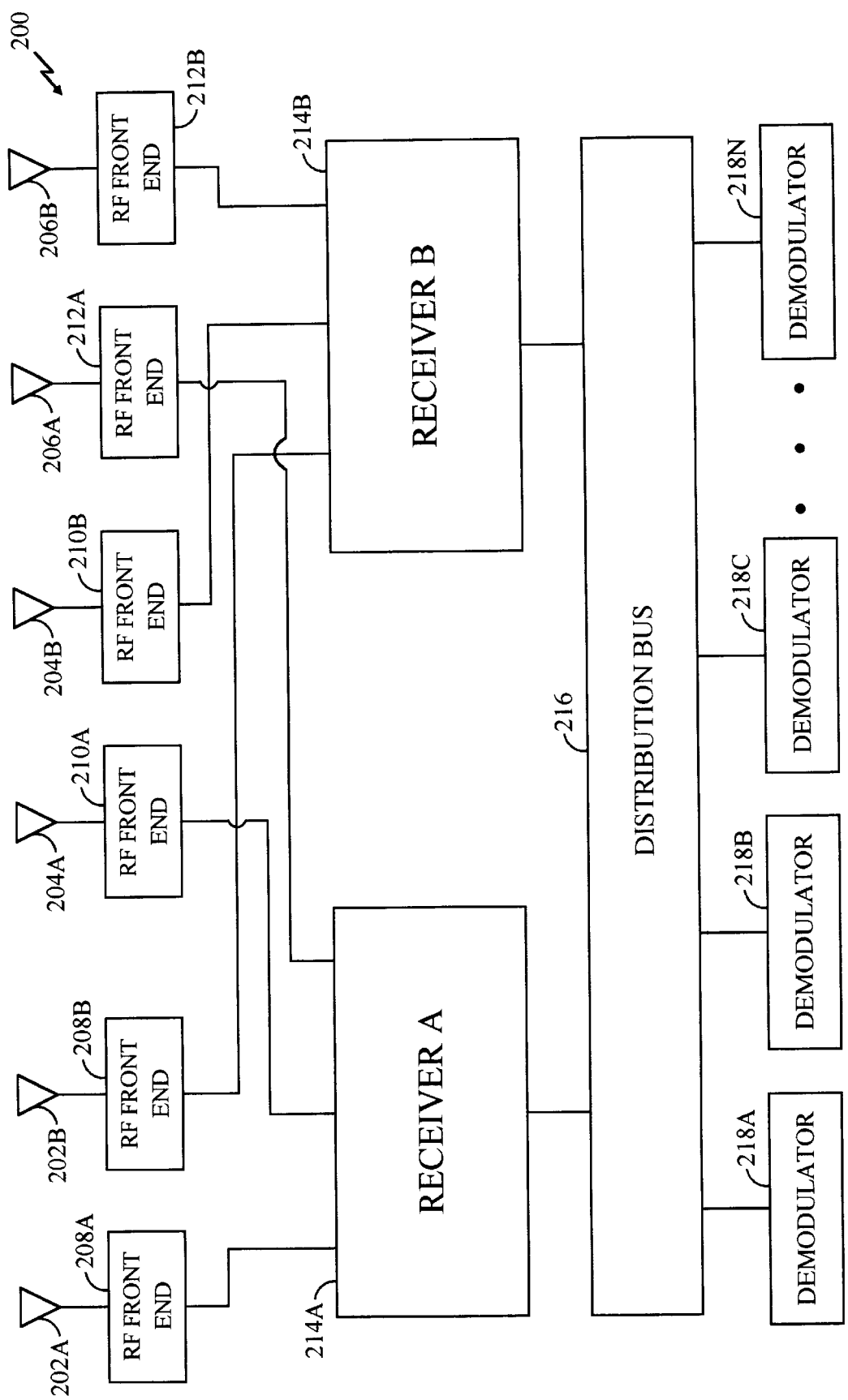
FIG. 2 is a functional block diagram of a first embodiment of the base station of the present invention in which diversity reception paths are logically separated into separate failure paths.

Referring now to FIG. 2, a functional block diagram of an exemplary embodiment of the base station architecture 200 of the present invention is shown. In FIG. 2, a three-sectored base station architecture 200 is illustrated. However, the present invention is equally applicable to base stations with more or fewer than three sectors. The present invention is also equally applicable to base stations with one or many frequency assignments. Each sector of the three-sectored base station includes associated diversity antennas and RF front end components. Antennas 202A, 202B belong to a first sector, antennas 204A, 204B belong to a second sector, and antennas 206A, 206B belong to a third sector. Each pair of antennas 202A, 202B; 204A, 204B; and 206A, 206B are arranged in a diversity reception architecture whereby a first antenna in each antenna pair receives a version of the information signal which may be shifted in amplitude and phase from the version received by the second antenna in the same antenna pair due to the physical separation between the first and second antennas.

Figure 1:
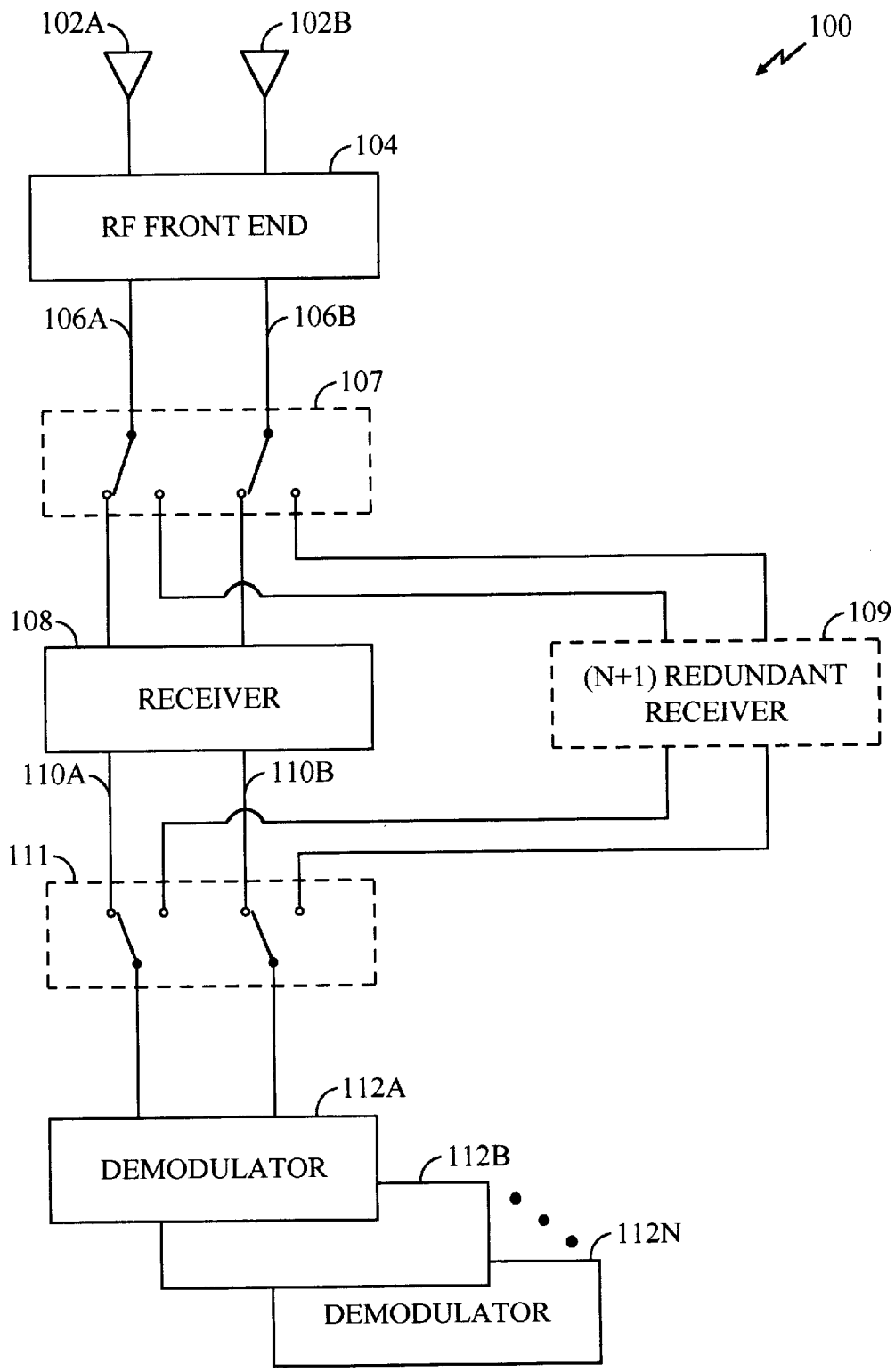
FIG. 1 is a functional block diagram of a prior art base station wherein the diversity reception paths are logically combined in the same failure path.

Each antenna is coupled to a respective RF front end. Thus, antenna 202A is coupled to RF front end 208A, and antenna 202B is coupled to RF front end 208B for the first sector. Antenna 204A is coupled to RF front end 210A, and antenna 204B is coupled to RF front end 210B for the second sector. Finally, antenna 206A is coupled to RF front end 212A, and antenna 206B is coupled to RF front end 212B for the third sector. Similar to RF front end 104 of FIG. 1, RF front ends 208A, 208B, 210A, 210B, 212A, and 212B may comprise bandpass filters and low-noise amplifiers as are known in the art. The present invention is not limited by the construction of RF front ends 208A, 208B, 210A, 210B, 212A, and 212B. However, it should be noted that in contrast to the single point of failure RF front end 104 of FIG. 1, the RF front ends 208A, 208B, 210A, 210B, 212A, and 212B of FIG. 2 are each coupled to only one of the respective antennas 202A, 202B, 204A, 204B, 206A, 206B. Specifically, RF front ends 208A, 208B, 210A, 210B, 212A, and 212B are preferably physically separate units, each being separately field-replaceable upon failure without disturbing any of the other RF front ends. Thus, when one of the RF front ends 208A, 208B, 210A, 210B, 212A, or 212B fails, it will have no effect on the continuing operation of the remainder of the RF front ends. Although not depicted in FIG. 2 or 3, the present invention also contemplates grouping the RF front ends 208A–212B by diversity. This would involve merely routing all diversity A antennas 202A, 204A, 206A to one RF front end, and all diversity B antennas 202B, 204B, and 206B to another RF front end in accordance with the principles described herein.

In the illustration of FIG. 2, antennas 202A, 204A, and 206A shall be referred to as the "diversity A" antennas, and antennas 202B, 204B, and 206B shall be referred to as the "diversity B" antennas. The output of each of the diversity A antennas 202A, 204A, 206A is coupled through its respective RF front end 208A, 210A, 212A to a first receiver 214A which shall be referred to as the "diversity A" receiver. Similarly, the output of each of the diversity B antennas 202B, 204B, 206B is coupled through its respective RF front end 208B, 210B, 212B to a second receiver 214B which shall be referred to as the "diversity B" receiver. Receivers 214A and 214B are similar to receiver 108 of FIG. 1 in that they downconvert and perform IF processing on signals received by the various antennas 202A, 202B, 204A, 204B, 206A, and 206B. However, in contrast to the single point of failure receiver 108 of FIG. 1, the receivers 214A, 214B each process only one of the two sets of diversity channels. Specifically, the diversity A receiver 214A and the diversity B receiver 214B are preferably physically separate units which are individually field replaceable without disturbing the operation of the other diversity receiver. Thus, when either diversity A receiver 214A or diversity B receiver 214B fails, it does not affect the continuing operation of the remaining receiver.

In the embodiment of FIG. 2, the output of each receiver 214A, 214B may be separately coupled to a distribution bus 216 which distributes the outputs of the receivers 214A, 214B to one or more of the demodulators 218A–218N. The construction of distribution bus 216 may be different depending on the nature of the output from the receivers 214A, 214B. In the simplest embodiment; distribution bus 216 is merely a backplane-style arrangement of inputs and outputs which each route either one or both of the outputs of receivers 214A, 214B to one or more of the demodulators 218A–218N. In another embodiment, distribution bus 216 may combine or multiplex the signals output from both receivers 214A, 214B onto a traditional multi-conductor bus for further distribution to the demodulators 218A–218N. Many distribution bus architectures known in the art may be used for distribution bus 216. The present invention is not limited by the specific construction of distribution bus 216.

In an exemplary embodiment, the receivers 214A, 214B each produce in-phase (I) and quadrature (Q) digital samples of the received signals, and output these I/Q samples onto the distribution bus 216. The I/Q samples may then be processed by one or more of the demodulators 218A-218N in parallel. This provides even further inherent redundancy as many of the separate demodulator units 218A–218N may all "listen" to the same I/Q sample data stream produced by the receivers 214A, 214B. Similar to the demodulators 112A–112N of FIG. 1, demodulators 218A–218N of FIG. 2 demodulate and perform baseband processing on the received signals. In an exemplary CDMA base station, the demodulators 218A–218N demodulate I/Q samples produced by the receiver 214A, 214B in accordance with well-known principles. However, in other embodiments, receivers 214A, 214B may generate raw IF digital samples which have not been separated into I/Q components, or even raw IF analog waveforms which are then demodulated by the demodulators 218A–218N.

As will be evident to one of ordinary skill in the art, the loss of any single antenna 202A, 202B, 204A, 204B, 206A, or 206B will result in merely the loss of one of the diversity channels for one of the three sectors. The remaining antennas will continue to operate properly and be unaffected by the failure. Likewise, the failure of any single RF front end 208A, 208B, 210A, 210B, 212A, or 212B will result in merely the loss of one of the diversity channels for one of the three sectors.

Additionally, the failure of either diversity receiver 214A or 214B will result merely in the loss of one of the diversity paths from each of the three sectors, leaving the other diversity path from each of the three sectors intact. As a result, the advantages of diversity reception (i.e., improved processing gain) will be lost for the affected sectors. However, the remaining diversity receiver will continue to operate properly, allowing a somewhat degraded mode of operation without total loss of service for any sector.

Thus, by keeping the diversity receive paths defined by the diversity "A" RF front ends 208A, 210A, 212A and receiver 214A physically separate from the diversity receive paths defined by diversity "B" RF front ends 208B, 210B, 212B and receiver 214B, the present invention obtains soft redundancy without additional hardware, software, size, power dissipation or other problems associated with the traditional N+1 redundancy approach. This is because the diversity "A" and diversity "B" reception paths are logically separated into separate failure paths. During a failure of one of the diversity paths (A or B), the base station 200 will continue to operate in each physical sector, but with only one diversity antenna working. In an exemplary CDMA system, the reduction in base station call capacity incurred by using only one of the two diversity antennas in each sector depends on how well the two diversity receive paths were originally balanced. For example, if each of the two antennas in each sector were receiving 50% of the total signal energy for that sector (i.e., equally balanced), then loss of one of the two diversity receive paths would result in approximately a 50% loss in total signal energy for the affected sectors.

Figure 3:
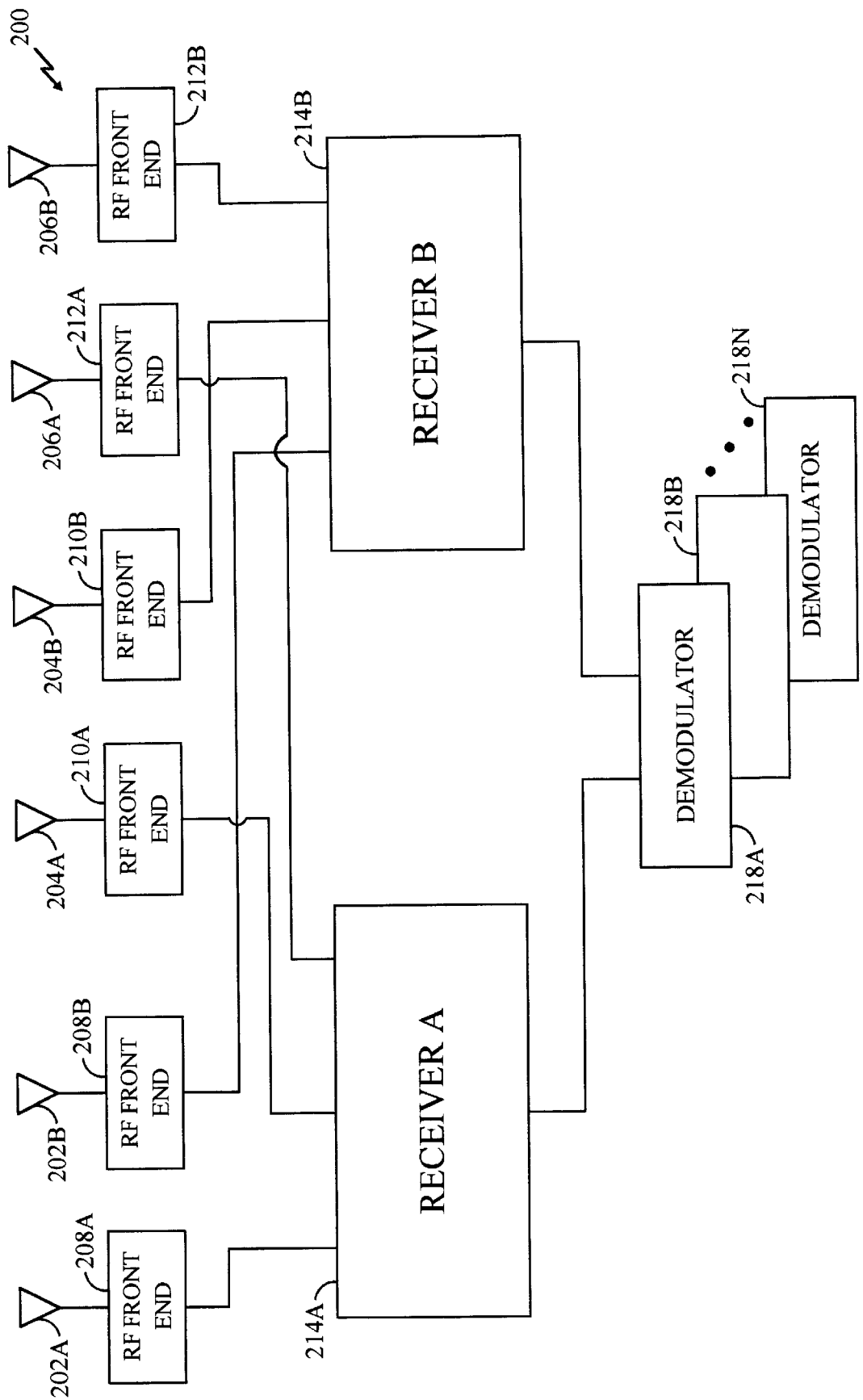
FIG. 3 is a functional block diagram of a second embodiment of the base station of the present invention in which diversity reception paths are logically separated into separate failure paths.

FIG. 3 illustrates an alternate embodiment of the present invention in which a distribution bus 216 (of FIG. 2) is not used. In the embodiment of FIG. 3, receivers 214A, 214B are directly coupled to the plurality of demodulators 218A–218N. This embodiment is useful, for example, when the receivers 214A, 214B have dedicated demodulation resources, or when the bussing function is inherent to the demodulators 218A–218N themselves. In other respects, the elements of FIG. 3 function similarly to their correspondingly numbered counterparts of FIG. 2.

Thus, the present invention gains enhanced redundancy in a base station using diversity reception techniques by logically aligning the possible single points of failure for the receivers on a per-diversity-path basis rather than on a per-base station or per-sector basis. Furthermore, the present invention actually reduces the modular complexity of a three-sector diversity reception base station because instead of having four receivers (one for each sector, plus one for redundancy in standby), the present invention only uses two receivers 214A and 214B.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

We claim:

1. A CDMA receiver system, comprising:
    a first space diversity reception path for receiving a first radio signal comprising a first diversity antenna and a first diversity receiver;
    a second space diversity reception path for receiving a second radio signal comprising a second diversity antenna and a second diversity receiver; and
    a plurality of demodulators for diversity combining said first and second radio signals and for demodulating said space diversity combined first and second radio signals;
    wherein said first and second space diversity paths are logically separated into different failure paths having no single point of failure.

2. The system of claim 1 further comprising a distribution bus for providing said received first radio signal and said received second radio signal to said demodulator.

3. The receiver system of claim 2 wherein said first and second diversity reception paths each comprise:
    a separate diversity antenna;
    a separate diversity receivers, said diversity receiver coupled to an output of said diversity antenna.

4. The receiver system of claim 3 wherein each of said first and second diversity reception paths further comprises a first RF front end circuit coupled to an output of a separate diversity antenna, and a second RF front end circuit coupled to an output of another separate diversity antenna, said first and second RF front end circuits for filtering and amplifying signals received by the separate diversity antennas.

5. The receiver system of claim 3 wherein the separate receivers generate in-phase and quadrature or IF samples of signals received by the separate diversity antennas.

6. A CDMA base station, comprising:
    a plurality of sectors, one or more frequency assignments, each sector having a first space diversity antenna and a second space diversity antenna;
    first and second space diversity receivers, said first space diversity receiver coupled to an output of each of said first space diversity antennas and said second diversity receiver coupled to an output of each of said second space diversity antennas said first and second diversity receivers being logically separated into different failure paths having no single point of failure; and,
    a plurality of demodulators, coupled to said first and second receivers.

7. The base station of claim 6 further comprising a distribution bus coupled to said first and second receivers and said plurality of demodulators and interposed therebetween for distributing received signals to said plurality of demodulators.

8. The base station of claim 7 wherein each of said sectors further comprises a first RF front end circuit coupled to an output of said first diversity antenna, and a second RF front end circuit coupled to an output of said second diversity antenna, said first and second RF front end circuits for filtering and amplifying signals received by said first and second diversity antennas.

9. The base station of claim 7 wherein said first and second receivers generate in-phase and quadrature or IF samples of signals received by said first and second diversity antennas.

* * * * *